Nov. 10, 1970          R. M. MEYER                3,539,410
                      RELIEF MODELS
Filed Nov. 20, 1967                          3 Sheets-Sheet 1

United States Patent Office 3,539,410
Patented Nov. 10, 1970

3,539,410
RELIEF MODELS
Richard Mayne Meyer, Ottawa, Ontario, Canada, assignor to General Photogrammetric Services Limited, Ottawa, Ontario, Canada, a corporation of Ontario
Filed Nov. 20, 1967, Ser. No. 684,449
Int. Cl. B44c 1/22
U.S. Cl. 156—58
6 Claims

ABSTRACT OF THE DISCLOSURE

A relief map composed of contour layers wherein the contour layers are produced by using a photo-mechanical process to coat the surface of a number of zinc plates with a layer of resist corresponding to the shape of the contour layers and then etching the zinc plates in an acid bath. The contour layers are then assembled using contour lines etched on one surface of each contour layer to position adjacent contour layers which are then bonded together by soldering.

This invention relates to relief maps and to a process for making relief maps.

It is an object of this invention to provide a relief map of extremely durable construction composed of superimposed metal contour layers the shape of which corresponds to the configuration of the contour lines on a topographical map.

Another object of this invention is to provide a relief map of high accuracy wherein the contour layers comprising the model are produced from metal plates by a photo-etching process.

A still further object of this invention is to provide a relief map composed of metal contour layers upon which are etched the contour lines situated between the contour lines which form the edges thereof in order to facilitate the accurate positioning of superimposed contour layers.

A still further object of this invention is to provide a relief map which is light in weight and economical in material wherein the contour layers comprising the model are shaped to produce a relief model having a hollow core.

Referring to the drawings.

Figure 3C:
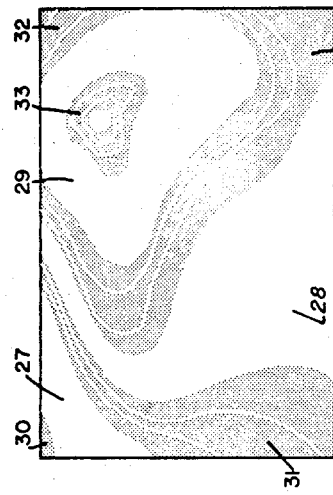
Figure 3B:
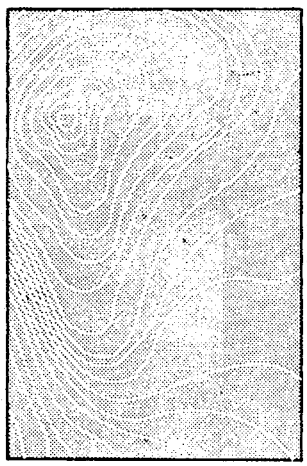

FIGS. 3(a), 3(b) and 3(c), located on the second page of drawings, show the steps of processing a peelcoat sheet.

FIG. 3(a) shows a peelcoat sheet upon which the contour lines have been photographically inscribed.

FIG. 3(b) shows the peelcoat sheet after treatment to remove the peelable coating under the photographically inscribed contour lines.

FIG. 3(c) shows the peelcoat sheet after the peelcoating between selected contour lines has been peeled.

Figure 4:
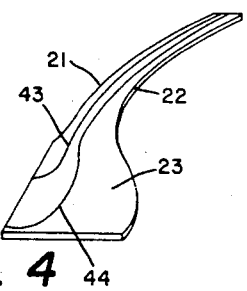

FIG. 4 shows a typical contour layer.

Figure 5C:
Figure 5B:
Figure 3:
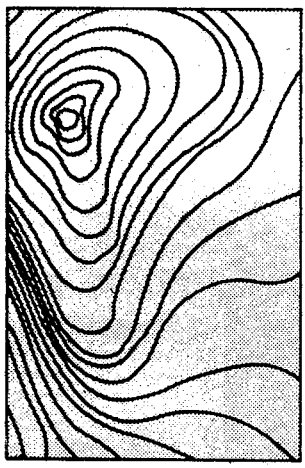
Figure 5:
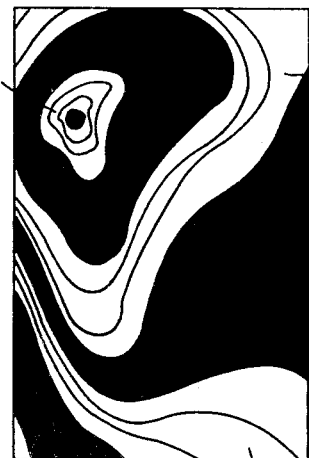

FIGS. 5(a), 5(b) and 5(c), located on the second page of drawings, show the negative transparencies of each of the processed peelcoat sheets, known as number one positives.

Figure 6A:
Figure 6B:
Figure 6C:

FIGS. 6(a), 6(b) and 6(c), show transparencies known as number two positives which are produced by photographically combining a number one positive and the positive transparency of the contour lines.

Figure 7:
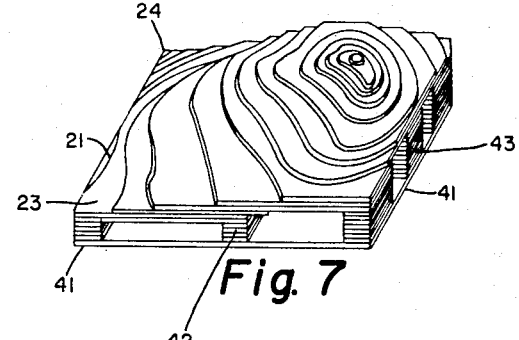

FIG. 7, located on the first page of drawings, shows the completed relief map prior to the application of the filler material to the surface.

Figure 8:
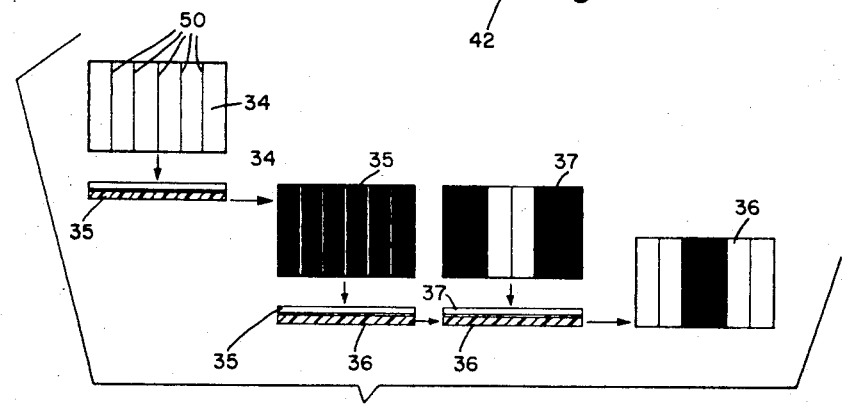

FIG. 8, shown on the first page of drawings, schematically illustrates the process of producing number two positives.

Figure 9C:
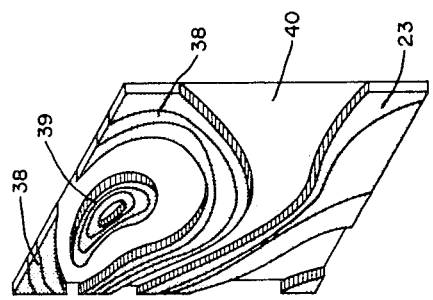
Figure 9B:
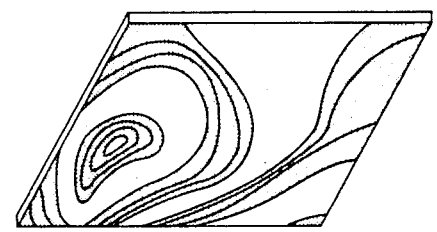
Figure 9A:
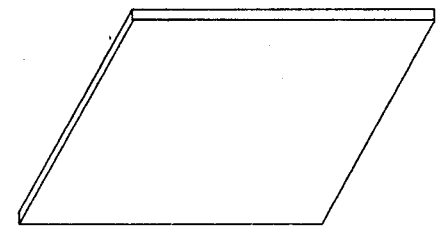

FIG. 9(a) shows a zinc plate used for producing the contour layers.

FIG. 9(b) shows the zinc plate upon which a layer of resist is photographically inscribed in areas corresponding to the contour layers.

FIG. 9(c) shows the contour layers which have been formed from the zinc plate following treatment of the zinc plate in an acid bath.

As shown in the drawings, a relief map made according to this process is composed of metal contour layers which are shaped by a photo-etching process to conform to the configuration of contour lines on a topographical map. The contour layers are formed from zinc plates using an etching process which consumes the areas of the zinc plates between the contour layers. The resulting contour layers are assembled and soldered together and coated with a filler material to produce a smooth continuous external surface.

Transparencies of the contour layers are used to photographically produce a pattern of resist coating on the zinc plates corresponding to the configuration of the contour layers. This layer of resist coating prevents such areas from being consumed by the acid. The transparencies used in this process, known as number one and number two positives, are produced photographically from the peelcoat sheets which have been subjected to a photomechanical process to differentiate between the areas which will constitute the contour layers and the intervening areas.

Figure 1:
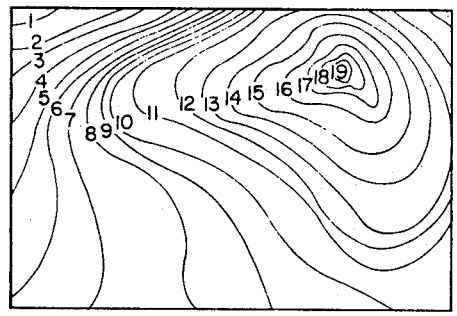
FIG. 1 is a plan view of a transparency showing the contour lines of an area of land. This transparency is used for printing a single colour impression of the contour lines on a topographical map.

The first step according to the method of the present invention is to examine the positive transparency of the contour lines, shown in FIG. 1, to determine the number of zinc plates necessary to produce the contour layers. The number of zinc plates necessary depends on the number of contour layers which can be obtained from each plate which in turn depends on the width of the contour layers.

The width of the contour layers is the distance between a preselected number of contour lines and is the same for each contour layer. In selecting the number of contour lines which will be spanned by the contour layers, consideration is given the minimum spacing of the contour lines. Because a finite amount of material is removed from the etched edges of the contour layers during the etching process, the spacing of the contour lines forming the edges of each contour layer must be such that the minimum width of the contour layers is not less than $\frac{1}{10}$ inch in order to ensure sufficient overlapping of adjacent contour layers. With the normal spacing of the contour lines on a topographical map, contour layers five contours in width are sufficiently wide to provide adequate overlapping of adjacent contour layers. However, if the contour lines are very closely spaced so that there are substantial areas in which more than five contour lines are situated within a distance of $\frac{1}{10}$ inch, the number of contours spanned by the contour layers must be made accordingly greater in order that the minimum width of the contour layers shall not be less than 1/10 inch. Thus, for example, if the minimum spacing of the contour lines over a substantial area of the topographical map is such that seven lines are situated within a distance of 1/10 inch, then the contour layers would be made seven contours wide. In the example illustrated in the drawings, the contour layers were chosen to be three contours in width for simplicity.

Once the width of the contour layers has been determined, the number of plates required to produce the contour layers can be calculated by multiplying by two, the number of contours spanned by a contour layer. The reason for this relationship will become apparent later on. Thus, in the example illustrated in the drawings, since the width of the contour layers was chosen to be three contours, six plates will be required to produce the contour layers.

Figure 2:
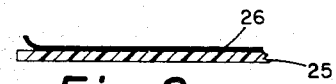
FIG. 2 is a sectional view of a sheet of peelcoat material.

The next step in the process consists of processing of the peelcoat sheets. The number of peelcoat sheets required equals the number of contours spanned by each contour layer, as previously determined, or is equal to one half the number of zinc plates used. The peelcoat sheets have the same dimensions as the zinc plates and, as shown in FIG. 2, comprise a transparent base 25 having a peelable actinically opaque coating 26.

The coated surface of each peelcoat sheet is first rendered photosensitive by means of the application of a layer of deep etch sensitizer to the peelable coating on the sheet. The photosensitive surface of each peelcoat sheet is placed in contact with the positive transparency of the contour lines shown in FIG. 1, and the photosensitive surface of the peelcoat sheet is exposed to a source of actinic light. The transparency is then removed from contact with the peelcoat sheet and the photosensitive surface of the peelcoat sheet is treated with a deep etch coating developer to remove the layer of sensitized coating in areas which were shielded from the light by the opaque areas of the positive transparency, i.e., in areas corresponding to the contour lines on the positive transparency. The peelcoat material which has been thus exposed by the removal of the overlayer of sensitized coating is chemically removed from the transparent base by the application of a solution of ethyl alcohol to which calcium chloride has been added to remove any residual water. The ethyl alcohol applied to the coated surface dissolves the peelcoating in areas in which the overlayer of sensitized coating has previously been removed. However, if any residual of water is present in the alcohol, it will remove the photosensitive layer thus causing the alcohol to dissolve the peelcoating in areas other than along the contour lines.

Following the etching of the contour lines in the peelcoating, the photosensitive layer on the coating of the peelcoat sheet is removed by washing with water. As shown in FIG. 3(b), the peelcoat sheet so processed forms a negative transparency of the transparency of the contour lines shown in FIG. 1.

The final step in preparing the peelcoat sheets consists of peeling, from the transparent base of the peelcoat sheet, alternate strips of the peelable coating bounded by two contour lines a preselected number of contours apart. The selection of the number of contours to be spanned by the contour layers was the first step in this process and depends on previously explained factors. It is apparent that the earlier step of etching the contour lines in the peelcoating now makes it a simple matter to peel strips from the peelcoat sheets which will be bounded by contour lines.

FIG. 3(c) illustrates a peelcoat sheet from which alternate strips of the peelcoating three contours in width have been peeled. The unpeeled areas 31, 32 and 33 of the peelcoating situated between the peeled strips are of the same number of contours in width as peeled strips 27, 28 and 29. The same procedure of peeling alternate strips of the peelcoating is followed with each peelcoat sheet. However, with each successive sheet, the contour lines forming the edges of the peeled strips are progressively offset by one contour from those of the previous peelcoat sheet. The resulting peelcoat sheets will have no peeled or unpeeled area duplicating any other peeled or unpeeled area.

In the peelcoat sheet illustrated in FIG. 3(c), the peelcoating between contour lines 1 and 4, 7 and 10, 13 and 16 and within contour line 19 has been peeled. A negative transparency of the peelcoat sheet, which is known as a number one positive, is obtained by exposing a photographic film in contact with the stripped peelcoat sheet such as shown in FIG. 3(c) to a source of actinic light thereby producing the negative transparency as shown in FIG. 5(a).

A second peelcoat sheet is stripped of the peelcoating between contour lines 2 and 5, 8 and 11, 14 and 17 and a negative transparency of the resulting peelcoat sheet is made. FIG. 5(b) shows the negative transparency made from this second peelcoat sheet which is also known as a number one positive.

FIG. 5(c) shows the number one positive which is made by stripping from a third peelcoat sheet the peelcoating between contour lines 3 and 6, 9 and 12, 15 and 18 and making a negative transparency of the resulting peelcoat sheet.

According to the method of the present invention, one contour layer corresponding to each contour line on the topographical map is used to construct the relief map. The process described to this point, will produce transparencies of one half this number of contour layers; such contour layers represented by the transparent areas of the number one positives marked with contour lines. Transparencies of the remaining contour layers known as number two positives, which are shown in FIGS. 6(a), (b) and (c), are produced by the method schematically illustrated in FIG. 8.

Referring to FIG. 8, sheet 34 schematically illustrates a positive transparency of the contour lines of a topographical map such as shown in FIG. 1. Lines 50 represent contour lines and the remaining areas are transparent. Sheet 37 schematically represent a number one positive such as shown in FIGS. 5(a), (b) and (c). According to the method of the present invention, a negative transparency 35 of the transparency 34 is produced by exposing a photographic film, in contact with the positive transparency 34, to a source of actinic light. The resulting transparency 35 is placed in contact with a number one positive 37 so that corresponding contour lines on the transparencies coincide and with a sheet of photographic film. The relative positions of the three sheets are then registered by punching a series of small spaced holes and inserting pins in the holes. This enables any of the sheets to be removed and then replaced in exactly the same position relative to the other sheets. The number one positive is removed and the photographic film 36, in contact with the transparency 35, is exposed. The transparency 35 is then removed and the number one positive 37 placed in contact with the photographic film 36 in its registered position and again exposed. The film 36 is then developed resulting in a transparency 36 which is essentially the complement of the number one positive 37. This process is repeated with each number one positive to produce the required number two positives such as shown in FIGS. 6(a), (b) and (c).

The next step according to the present process consists of producing contour layers from zinc plates of the type shown in FIG. 9. The plates used are commercially available zinc photo-engraving plates, normally for use in the printing trade, having a maximum thickness of .07 inch and coated on one side with an adhesive. Since the presence of the adhesive on the contour layer would prevent soldering of that surface, the adhesive coating is removed from the zinc plates by brushing the surface with a wire brush prior to etching. The plate is rendered photosensitive by coating one surface with a layer of polyvinyl alcohol which is applied by means of a plate whirler.

Each of the number one and number two positives such as shown in FIGS. 5(a), (b) and (c) and FIGS. 6(a), (b) and (c) is placed in contact with the sensitized surface of a zinc plate and exposed to a source of actinic light. Following exposure of the photosensitive surface of the plate, the transparency is removed and the sensitized surface of the plate developed and then fixed by baking in an infrared oven at about 400° F. for 3 minutes. This process results in an acid resistant coating, known as a resist, forming upon the surface of the zinc plate in areas which were not shielded from the actinic light by opaque areas of the transparency, i.e., in areas which define the contour layers.

Prior to etching, the non-sensitized surface of each zinc sheet is covered with masking tape in order to maintain the contour layers in position when the areas between contour layers have been etched away. The only masking tape which has been found to be sufficiently acid resistant for this purpose is that manufactured by Minnesota Mining & Manufacturing Co. and sold under the registered trade mark "3M."

The zinc plates are etched in a photo-engraving machine using a process similar to that used in the printing trade for etching photo-engraving plates. The process used in the printing trade is modified somewhat by diluting the etching oil with water softener, of the type sold under the registered trade mark "Raindrops," in order to achieve a more vertical shoulder at the etched edges rather than the sloped shoulder which is used in the printing trade.

Following completion of the etching process, the zinc plates appear as shown in FIG. 9(c), with the portions of the plate surrounding the contour layers etched away leaving only the contour layers 23, 38 and 39 held together by masking tape 40. The contour layers are then washed with soap and water to remove the oil and acid.

FIG. 4 shows a typical contour layer wherein etched edges 21 and 22 conform to contour lines 4 and 7 respectively on the topographical map shown in FIG. 1. Etched edge 21 has a positive form relative to the actual contour of the land and forms a part of the functional outer surface of the relief model. Etched edge 22 corresponds to contour line 7 on the topographical map and has a negative form, relative to the actual contour of the land. Edge 22 forms part of the non-functional, hollow, inner surface of the model.

As shown in FIG. 7, the contour layers are assembled on a plane metal base 41 of exactly the same dimensions as the relief map. The lowermost contour layer which is mounted directly on the base is positioned on the base using a photographic plastic sheet inscribed with the contour lines. The lowermost contour layer is riveted to the base and each succeeding contour layer is positioned and then soldered to the contour layer beneath it. As a result of the photo-etching process used in making the contour layers, one surface of each contour layer will be covered with a layer of resist which protects the contour layer from the acid. However, this layer of resist also has the effect of preventing soldering of that surface and, consequently, must be removed by wire brushing each contour layer prior to attempting to solder that surface.

As shown in FIGS. 5(a), (b) and (c) and 6(a), (b) and (c), contour lines appear as opaque lines in the transparent areas of the number one and number two negatives. As a result, the zinc plates are not coated with resist along these contour lines and, consequently, as shown in FIG. 4, fine lines 42 and 43 corresponding to contour lines are etched in the surface of the contour layer. Since the contour line adjacent the functional edge of the contour layer corresponds to the functional edge of the superposed contour layer, it is used to position the superposed contour layer.

After a contour layer has been positioned so that its functional edge coincides with the corresponding etched contour line, it is soldered in place using air acetylene torches to heat the plates and allowing the solder to flow between the plates. Care must be exercised in heating the plates in view of the low melting point of zinc. It has been found that the best type of solder for use in this process is that sold under the trade mark "Kester/50" having an A-type core and a type 415 flux.

In assembling the model, it is necessary to provide support at intervals for the overhanging contour layers. As shown in FIG. 7, support is provided by stacks of shims 42 and 43 inserted at intervals beneath the contour layers.

Following assembly of the contour layers, additional small contour details may be added by means of a solder gun. The assembled contour layers are then cleaned with trichloroethylene using wire brushes and sprayed with a grey lacquer primer.

In order to simulate the actual terrain, the stepped surface of the relief map is coated with a filler substance to provide a smooth outer surface. The preferred filler substance consists of plaster mixed with cellulose fibres sold under the registered trade mark "Polyfilla."

Drainage patterns on the relief map are then shaped using dental probes and the coated surface of the model is sprayed with grey lacquer primer.

I claim:

1. The method of making three dimensional models which comprises etching contour layers from metal plates, assembling and bonding said contour layers.

2. A method of making relief maps composed of contour layers which comprises etching metal plates to form contour layers having two etched edges which correspond to contour lines on a topographical map, positioning each of said contour layers on a subjacent contour layer and soldering each of said contour layers.

3. A method of making relief maps composed of metal contour layers comprising, preparing said contour layers by means of a photo-etching process whereby each of said contour layers has a functional edge having the shape of a contour line on a topographical map and each of said contour layers has etched on one surface thereof a contour line corresponding to the configuration of the functional edge of an adjacent contour layer, assembling said contour layers using said etched contour lines to position contour layers, soldering each contour layer after it has been positioned, supporting the assembled contour layers by inserting stacks of shims under the contour layers at intervals and coating the outer surface of the assembled contour layers with a filler material.

4. A method of making relief maps which comprises preparing metal contour layers the edges of which correspond to contour lines on a topographical map, said contour layers having etched on one surface thereof the contour lines situated between said contour lines forming the edges thereof, assembling said contour layers using one of said etched contour lines to position the superposed contour layers, soldering each said positioned contour layer after it is positioned and applying a filler material to the stepped outer surface of the model.

5. The method as claimed in claim 2 wherein said contour layers are produced by preparing transparencies containing opaque areas which define the shape of the contour layers; using said transparencies to photographically produce an acid resistant coating on a portion of the surface of zinc plates in areas corresponding to the configuration of the desired contour layers; etching said zinc plates.

6. A method of making relief maps as described in claim 2 wherein the method of producing contour layers comprises: determining the number of contours which each contour layer must span; photographically inscribing the contour lines of said topographical map onto the coated surface of a plurality of peelcoat sheets; chemically etching said inscribed contour lines in said coated surface; peeling alternate strips of said peelcoating of a fixed number of contours in width from the transparent base of each, peelcoat sheet in such a manner that no peelcoat sheet duplicates another; obtaining number one positives by photographically producing negative transparencies of each of said peelcoat sheets; preparing a negative transparency of said contour lines on said topographical map; registering the negative transparency of each peelcoat sheet with said negative transparency of said contour lines and a sheet of photographic film; producing number two positives substantially complementary to said number one positives by exposing said photographic film in contact first with negative transparency of the peelcoat sheet, removing said negative transparency and exposing said photographic film in contact with said negative transparency of the contour lines; exposing to actinic light the photosensitive surface of each zinc printing plate in contact with a number one or number two positive; fixing and baking the exposed photosensitive surface of the zinc plate to provide an acid-resistant coating in areas not shielded by the opaque areas of the number one or number two positive; etching the zinc plates in an acid bath.

References Cited

UNITED STATES PATENTS

| | | | |
|---|---|---|---|
| 2,189,592 | 2/1940 | Perera | 35—41 |
| 2,711,606 | 6/1955 | Simjiam | 156—59 |
| 2,977,228 | 3/1961 | Gold et al. | 96—36 |

FOREIGN PATENTS

| | | |
|---|---|---|
| 1,427,983 | 1/1966 | France. |

VERLIN R. PENDEGRASS, Primary Examiner